United States Patent
Gopalarathnam et al.

(10) Patent No.: US 11,606,335 B2
(45) Date of Patent: Mar. 14, 2023

(54) SYSTEMS AND METHODS FOR HIERARCHICAL ACCESS CONTROL ACROSS DEVICES IN A NETWORK ENVIRONMENT

(71) Applicant: DELL PRODUCTS L.P., Round Rock, TX (US)

(72) Inventors: Sudharsan Dhamal Gopalarathnam, Redmond, WA (US); Avinash Natarajan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 403 days.

(21) Appl. No.: 16/401,645

(22) Filed: May 2, 2019

(65) Prior Publication Data

US 2020/0351246 A1 Nov. 5, 2020

(51) Int. Cl.
*H04L 29/06* (2006.01)
*H04L 9/40* (2022.01)
*H04L 12/46* (2006.01)

(52) U.S. Cl.
CPC ........ *H04L 63/0263* (2013.01); *H04L 12/465* (2013.01); *H04L 63/101* (2013.01); *H04L 63/104* (2013.01)

(58) Field of Classification Search
CPC ...... G06F 13/00; G06F 21/31; G06F 21/6218; H04L 63/08; H04L 63/10; H04L 63/083; H04L 67/00; H04L 67/02
USPC .......................................................... 726/2
See application file for complete search history.

(56) References Cited

U.S. PATENT DOCUMENTS

| | | | |
|---|---|---|---|
| 8,224,361 B2* | 7/2012 | Timmons | H04L 67/327 455/466 |
| 9,325,610 B2* | 4/2016 | Pruss | H04L 45/74 |
| 9,686,236 B2* | 6/2017 | Lukin | H04L 63/14 |
| 9,819,699 B1* | 11/2017 | Nenov | H04L 63/0263 |
| 10,148,459 B2* | 12/2018 | Chiu | H04L 61/6022 |
| 10,447,541 B2* | 10/2019 | Gaikwad | H04L 41/0893 |
| 10,609,081 B1* | 3/2020 | Appala | H04L 63/0227 |
| 11,082,259 B1* | 8/2021 | Devaraj | H04L 45/586 |
| 2009/0149186 A1* | 6/2009 | Kokoszka | H04L 45/00 455/445 |
| 2015/0271138 A1* | 9/2015 | Lukin | H04M 1/72436 455/410 |
| 2016/0269511 A1* | 9/2016 | Guo | H04L 69/22 |
| 2017/0223151 A1* | 8/2017 | Brunner | H04L 69/22 |
| 2018/0048537 A1* | 2/2018 | Gaikwad | H04L 41/0896 |
| 2018/0115471 A1* | 4/2018 | Curcio | H04L 63/0245 |

(Continued)

*Primary Examiner* — Shin-Hon (Eric) Chen
(74) *Attorney, Agent, or Firm* — North Weber & Baugh LLP (57) ABSTRACT

Access control systems and methods herein successfully overcome ACL group width limitations of existing designs by splitting an ACL group across different units, e.g., to create two ACL groups that each has a relatively smaller width. In embodiments, availability of ACL space is increased by hierarchically splitting an ACL table to fit into different two coupled devices and modifying certain fields carrying metadata in packets that are exchanged between the devices, such that one chipset may carry information about the lookup of another. In embodiments, an ACL group for a port extender is created by selectively creating a sub-group with qualifiers that fit within an available group width, and moving the remaining qualifiers to a controlling bridge to achieve the desired functionality.

20 Claims, 9 Drawing Sheets

(56) References Cited

U.S. PATENT DOCUMENTS

| | | | |
|---|---|---|---|
| 2018/0191683 A1* | 7/2018 | Wighe | H04L 63/0263 |
| 2019/0273717 A1* | 9/2019 | Dearien | H04L 43/18 |
| 2019/0294438 A1* | 9/2019 | Wang | G06F 9/3004 |
| 2020/0287888 A1* | 9/2020 | Moore | H04L 63/0884 |
| 2021/0367927 A1* | 11/2021 | Selvaraj | H04L 49/3063 |
| 2021/0409317 A1* | 12/2021 | Seshan | H04L 45/38 |
| 2022/0021653 A1* | 1/2022 | Metz | H04L 63/20 |

* cited by examiner

| SRC IPv6 | DST IPv6 | VLAN | ACTION |
|---|---|---|---|
| 1000::01 | 1010::01 | 11 | Drop |
| 1000::02 | 1010::02 | 12 | Drop |
| 1000::03 | 1010::03 | 13 | Drop |
| 1000::04 | 1010::04 | 14 | Trap |

| DST IPv6 | E-TAG ADDITION ACTION (FILL E-TAG RESERVED FIELD VALUE) |
|---|---|
| 1010::01 | 1 |
| 1010::02 | 2 |
| 1010::03 | 3 |
| 1010::04 | 4 |

| SRC IPv6 | VLAN | E-TAG RESERVED FIELD | ACTION |
|---|---|---|---|
| 1000::01 | 11 | 1 | Drop |
| 1000::02 | 12 | 2 | Drop |
| 1000::03 | 13 | 3 | Drop |
| 1000::04 | 14 | 4 | Trap |

SYSTEMS AND METHODS FOR HIERARCHICAL ACCESS CONTROL ACROSS DEVICES IN A NETWORK ENVIRONMENT

BACKGROUND

The present disclosure relates generally to information handling systems. More particularly, the present disclosure relates to access control in network environments, such as port extender environments.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, when an access control list (ACL) group is created in a chipset, a list of qualifiers, such as a source IP address (SRC IP), destination IP address (DST IP), etc., is used to create the group. Each qualifier will have a specific width, for example SRC IPv4 will have 4 bytes, while IPv6 will have 16 bytes. Based on the list of qualifiers used to create the ACL group, the group's width is calculated. Based on a field group's width, a group may be in one of the following modes—single-wide, double-wide, triple-wide, etc., dependent on the specific hardware used. For example, an NPU may have available a single hardware slice of 80 bits, such that a single-wide group will have available total key width that is less than 80 bits and occupy one hardware slice or memory. A double-wide table will have total key width less than 160 bits and will use two physical slices, and so on.

In practice, the number of hardware slices is limited. For example, some chipsets have 12 slices in an Ingress Content Aware Processor (ICAP) or ingress field processor (IFP) and, thus, the number of applications that can utilize ACL is limited. In scenarios where a switch has only one single-wide slice left that is available, but some application requires a double-wide region for access control purposes, the limited ACL group width will potentially interfere with a different existing application's claim for an ACL slice. Accordingly, it is desirable to provide systems and methods to improve access control in such network environments to overcome the limitations of designs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion, components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

It shall also be noted that although embodiments herein may be described within the context of ICAP and port extenders, aspects of the present disclosure are not so limited. Accordingly, the aspects of the present disclosure may be applied or adapted for use in other network environments to facilitate access control of hardware based on specific headers and fields or any combination thereof. For example, aspects of the present disclosure may be applied or adapted for use in multi-chip architectures in which packets ingress at a front-end port and are routed to one or more chipsets before arriving at the CPU. Such network environments, may be hierarchically structured and facilitate access control by allowing ACLs to be split into a number of sets and use metadata to carry the result of a first lookup from a first device to a second device.

Figure 1:
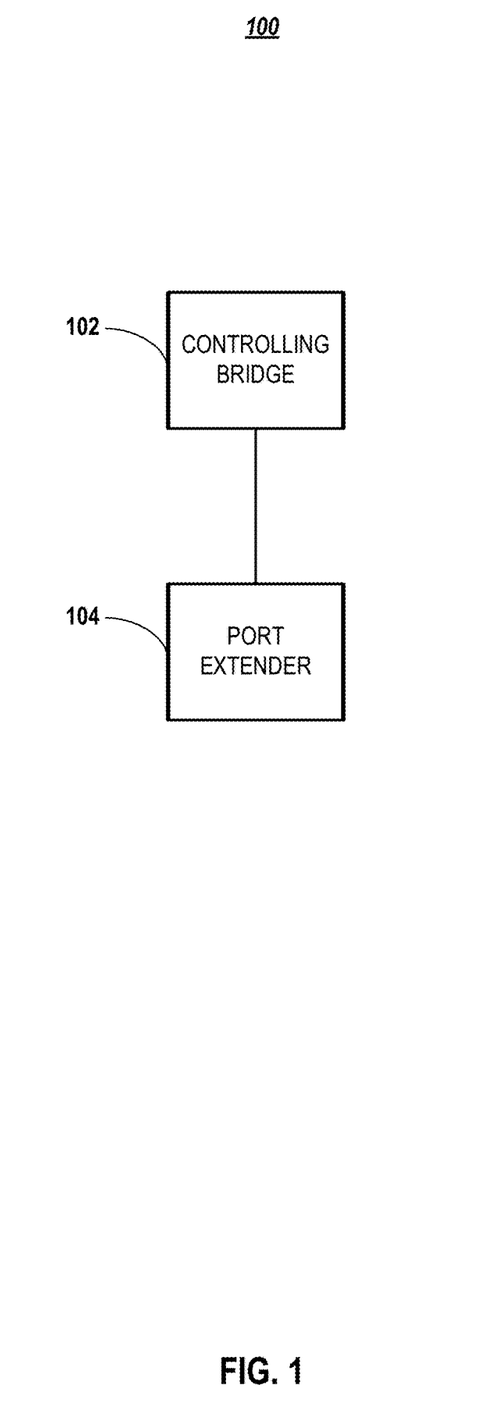
FIG. 1 depicts a common system for implementing an access control list group.

FIG. 1 illustrates a simplified system for implementing an access control list group. As will be discussed in greater detail below, an ACL group may be represented in a chipset in a hardware slice and may comprise a set of qualifiers, e.g., a triplet of source, destination, and VLAN identifier fields and an action. In practice, a user may apply ACL rules to determine how traffic flows through a network device, for example, by blocking certain IP addresses in network 100.

The port extender topology of system 100 comprises one controlling bridge 102 and one port extender 104. Assuming that port extender 104 has only one hardware slice available in ICAP, which decides whether to admit or deny a packet, with a possible table width of 160 bits, and further assuming that an application (or an administrator of system 100) wishes to create an ACL group, for example, presented in the ACL table in FIG. 3, which comprises a list of rules for, e.g., a switch or a router; and the ACL group comprises the following three types of qualifiers:
  (a) SRC IPv6—128 bits (16 bytes),
  (b) VLAN ID—12 bits, and
  (c) DST IPv6—128 bits.

Then, the number of required bits for this ACL group will be 268 bits, which would require a double-wide group. However, this is not feasible in port extender 104, as the required 268 bits would exceed the 160 bit width that port extender 104 may be able to accommodate.

Alternatively, assuming that port extender 104 may be able to accommodate a double-wide group i.e., two slices adding up to 320 bits, then two groups would have to be merged into a single group, and the remaining 55 bits would remain unused and, thus, be wasted.

In embodiments, an e-tag having a reserved field (16-bits long, as specified in IEEE 802.1br) may be used as an additional qualifier in the field processor, to solve this problem, as will be discussed next.

Figure 2:
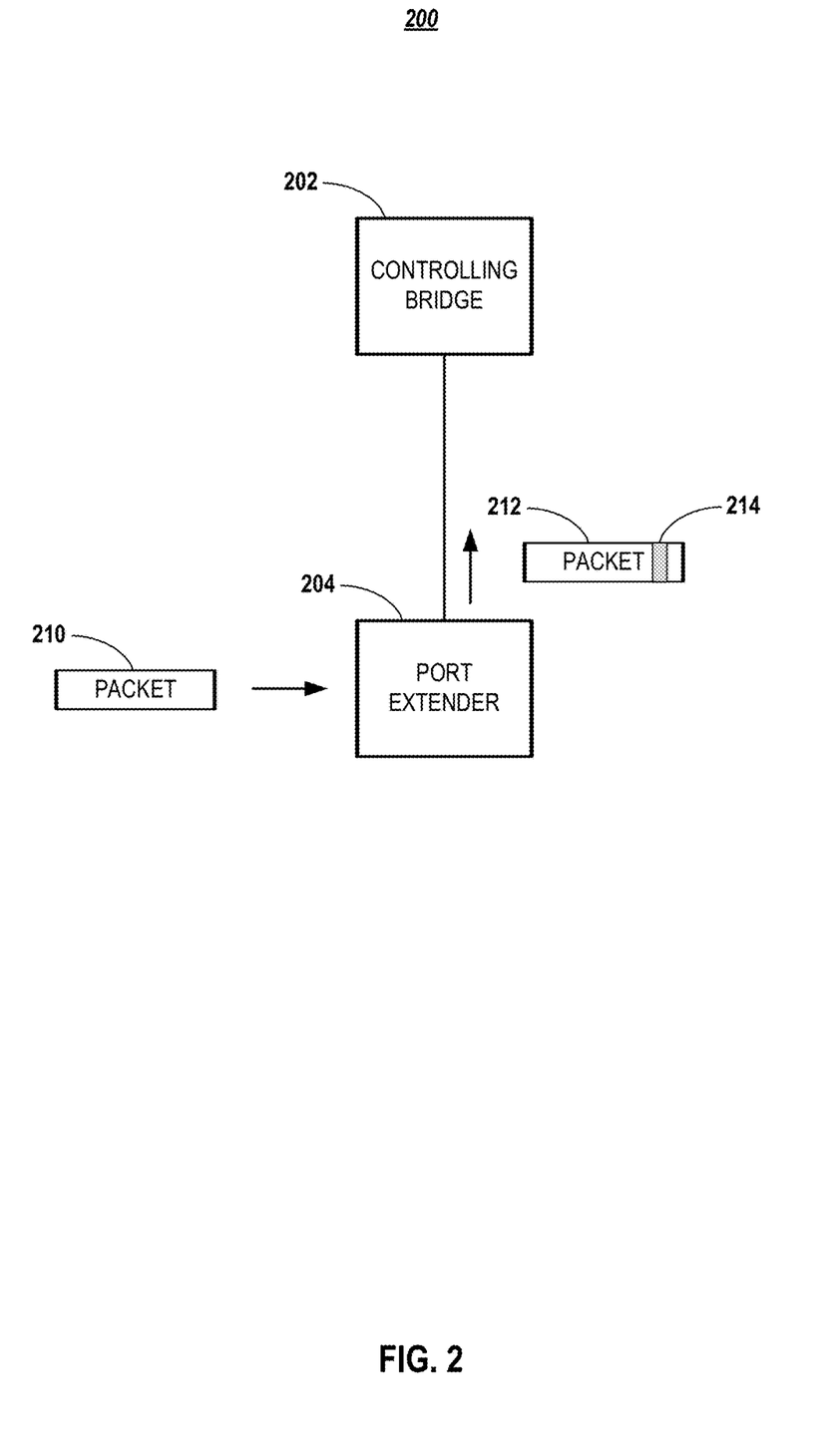
FIG. 2 illustrates a simplified system for implementing an access control rule across two devices, according to embodiments of the present disclosure.

FIG. 2 illustrates a simplified system for implementing an access control rule across two devices, according to embodiments of the present disclosure. The port extender topology of system 200 comprises controlling bridge 202 and port extender 204. It is understood that any number of port extenders 204 may be used and may serve, for example, as virtual ports to controlling bridge 202, i.e., the port extenders may be viewed as a single device from the view point of controlling bridge 202. Each of controlling bridge 202 and port extender 204 may have a certain number of field processor hardware slices available, e.g., as an entry in a table in a TCAM, which typically has a limited table width to accommodate different tables. The limited table widths impose restrictions on key lengths that can be stored in memory, e.g., 80 bits in one table and 160 bits in another table.

In embodiments, controlling bridge 202 divides the fields of an intended ACL group (see, e.g., FIG. 3) that comprises a set of qualifiers, i.e., a set of unique identifiers that make up a rule or policy, into two groups or tables to be stored, here, a port extender ACL table and a controlling bridge ACL table, respectively (see, e.g., FIGS. 4 and 5), that may have different table widths. A first group, which comprises a first sub-set of the set of qualifiers in the intended ACL group, e.g., a source IP address, SRC IPv6, and a VLAN ID and a second group, which comprises a second sub-set of fields, e.g., destination IP address, DST IPv6.

In embodiments, an e-tag-field 214 that serves as an additional qualifier may be associated with the first group to communicate in a certain environment, e.g., in an IEEE 802.1br environment, to match a specific field in the second ACL group. Using an e-tag 214 comprising, e.g., 16-bit e-tags fields as qualifier, in embodiments, controlling bridge 202 may create an ACL group in an available slice, such that the calculated sum of the ACL group width is 128+16+12=156 bits. In other words, the first group comprising the first sub-set of qualifiers can be stored in an ACL table that permits the creation of a 160 bits wide ACL group.

In embodiments, controlling bridge 202 may further create, e.g., in port extender 204, the second group that comprises DST IPv6 as a qualifier. In embodiments, the action for entries in the second group in port extender 204 may be to mark or internally assign an e-tag reserved field value with a specified value in each entry. In embodiments, this value may be matched in controlling bridge 202 to obtain a desired result.

In embodiments, port extender 204 may assign or add to a tag or an identifier metadata, such as an Outer VLAN tag, or a standard pre-existing e-tag that uses specific information, to classify packets. The tag or unique identifier may, thus, be added into the header of packets 212 that are exchanged between port extender 204 and controlling bridge 202, such that the packets carry, for example, encapsulated metadata regarding qualifiers of a split ACL rule for access control across chipsets, e.g., from one width-limited chip to another, without affecting other applications.

In embodiments, in response to packet 210 ingressing on port extender 204 and having a destination IP specified in a port extender ACL table, port extender 204 may look up the destination IP in the ACL table and perform a corresponding ACL action, such as filtering out the packet or forwarding the packet to controlling bridge 202, e.g., after an egress ACL lookup in an egress ACL table.

In detail, when packet 210 ingresses on port extender 204 and matches one of the destination IPv6 addresses in a port extender ACL table (FIG. 4), in embodiments, the packet's e-tag reserved field 214 may be filled with the value present in the e-tag addition action. In embodiments, controlling bridge 202, upon receiving packet 212, may check its controlling bridge ACL table (FIG. 5), and if the fields match, along with e-tag reserved field value, an action, as specified in the controlling bridge ACL table, may be taken. In this way, the desired behavior may be achieved by splitting an ACL table/group across two different processing units and marking packets to pass information about the presence of certain fields. Advantageously, splitting data in this manner enables the use of a smaller number of bits than the original intended ACL table (FIG. 3) would have required.

It is understood that ACL lookups may occur in parallel, based on priority, e.g., the priority of a group, or in any other combination. It is further understood that metadata may be any marking and may comprise compressed data.

Figure 3:
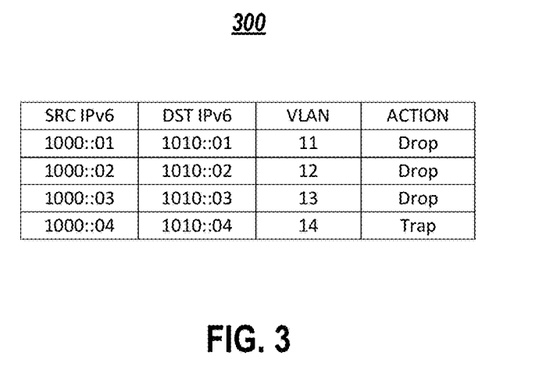
FIG. 3 depicts an exemplary ACL table for implementing access control rules.

FIG. 3 depicts an exemplary ACL table for implementing access control rules. In embodiments, when ACL table 300 is presented this way, an ACL manager in controlling bridge 202, in response to determining that the table cannot be created in the existing controlling bridge hardware, may split ACL table 300, according to various embodiments, to create, e.g., two tables—in the port extender, as shown in FIG. 4, and the other one in other in the controlling bridge, as shown in FIG. 5.

Figure 4:
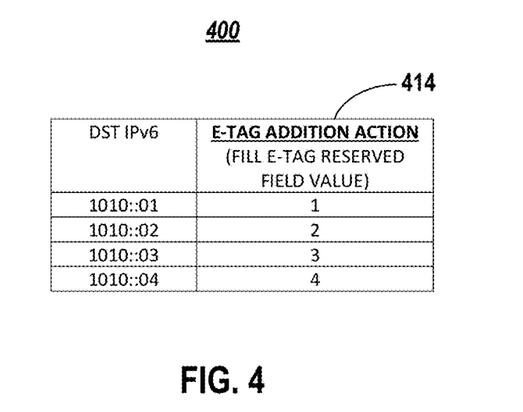
FIG. 4 illustrates a port extender ACL table for implementing an access control rule, according to embodiments of the present disclosure.

FIG. 4 illustrates a port extender ACL table for implementing an access control rule, according to embodiments of the present disclosure. Exemplary port extender ACL table 400 has a width of 128 bits that may consume a single slice. In embodiments, metadata may be added to the (otherwise unused) 16-bit reserved field 414 in the e-tag. The reserved field value 1 in added e-tag metadata, thus, corresponds to destination IPv6 value 1010:01, the reserved field value 2 corresponds to destination IPv6 value 1010:02, and so on.

Figure 5:
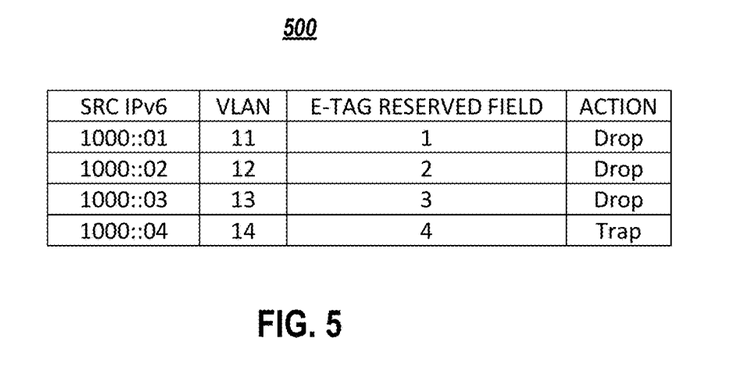
FIG. 5 illustrates a controlling bridge ACL table for implementing an access control rule, according to embodiments of the present disclosure.

FIG. 5 illustrates a controlling bridge ACL table for implementing an access control rule, according to embodiments of the present disclosure. As depicted, controlling bridge ACL table 500 has a width of 160 bits consuming a single slice. In embodiments, an application may use e-tag reserved field values 414 to correlate port extender ACL table 400 with controlling bridge ACL table 500. For example, the reserved field value 1 in added e-tag metadata correlates destination IPv6 value 1010:01 in port extender ACL table with source IPv6 value 1010:01 in controlling bridge ACL table 500, and so on. Therefore, instead of having destination IPv6 values directly in controlling bridge ACL table 500, port extender ACL table 400 may, advantageously, use e-tag fields 414 to communicate corresponding information in a metadata format. As a result, the data of the entire field group, i.e., source address, destination address, VLAN address, and action will be available to the controlling bridge, such that the controlling bridge may use its access control manager to execute the specified action that corresponds to some access control rule, e.g., upon matching the assigned e-tag fields.

One skilled in the art will appreciated that matching e-tag fields does not necessarily establish a correlation that otherwise would not be present. For example, even if e-tag fields match, if a destination address associated with an e-tag field does not correspond to a source address associated with that e-tag field, a packet would still not be matched despite matching e-tag fields.

It is understood that, depending on the mode of operation, created controlling bridge ACL tables 500 and port extender ACL tables 400 may have different table widths, e.g., 80 bits for one table and 160 bits in for another. The table width for an ACL group is determined by the number and type of qualifiers present in the group, e.g., an IPv4 ACL group, i.e., an L3 ACL group. It is further understood that, any device may be used to facilitate access control of hardware based on specific fields or combination of fields in a packet, e.g., source IP, destination MAC ID, protocol field, etc., without deviating from the scope of the present disclosure.

Figure 6:
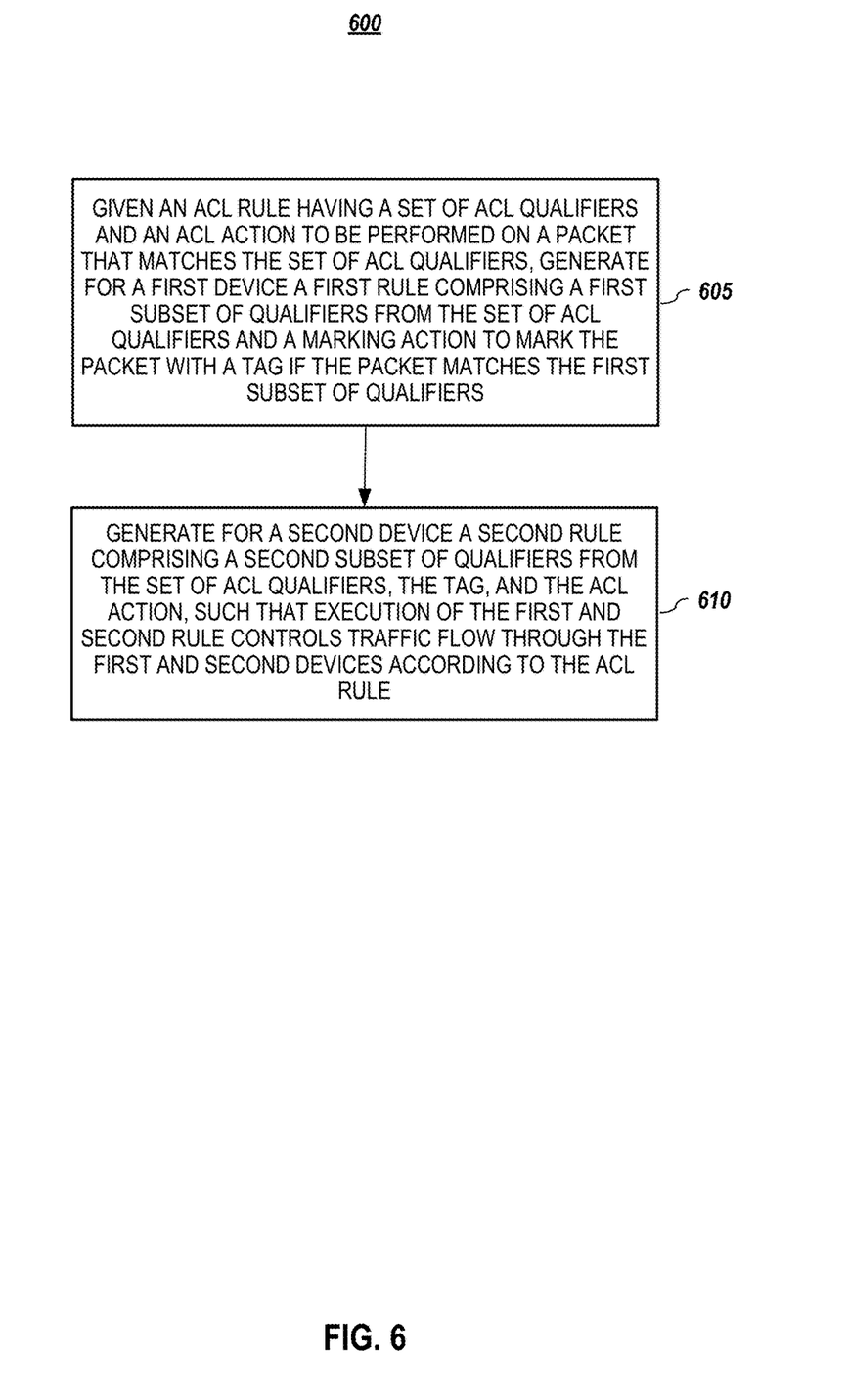
FIG. 6 is a flowchart illustrating a process for implementing an access control rule in a port extender environment, according to embodiments of the present disclosure.

FIG. 6 is a flowchart illustrating a process for implementing an access control rule in a port extender environment, according to embodiments of the present disclosure. In embodiments, an ACL rule may be defined as a set of values for the ACL qualifiers in the corresponding ACL table and an ACL action that is to be performed on a packet that matches the set of ACL qualifiers. Given such an ACL rule, process 600 may begin, e.g., by generating (605), for a first device such as a port extender, a first rule that comprises a first subset of qualifiers from the set of ACL qualifiers and a marking action for marking a packet with a tag if the received packet matches the first subset of qualifiers. In embodiments, the tag may be, for example, an e-tag or any other metadata identifier and may comprise any type of metadata known in the art. A second rule that comprises a second subset of qualifiers, the tag, and the ACL action, may be generated (610) for a second device, such as controlling bridge, such that when the two rules are executed and the ACL action is initiated, the combination of the two rules controls traffic flow through the port extender and the controlling bridge, according to the ACL rule.

In embodiments, the port extender may comprise a port extender ACL table that relates an e-tag to an ACL rule qualifier, e.g., a destination IP address. For the controlling bridge, a controlling bridge ACL table may be generated that relates the e-tag and a second ACL rule qualifier, e.g., a source IP address, to the ACL action. In embodiments, responsive to receiving, from the port extender a packet that matches the e-tag, that e-tag may be used as an additional ACL rule qualifier that relates the first ACL rule qualifier to the ACL action to be taken for the packet. The e-tag may be used to create in an available hardware slice an ACL group that combines the first and second ACL rule qualifiers into an ACL rule.

It is noted that in lieu of using e-tags discussed above, various other fields may equally be employed to carry metadata in packets communicated between, e.g., a controlling a bridge and a port extender. Similarly, in CLOS architectures, metadata may be communicated between the NPUs in leaf and spine, e.g., by employing unused fields in vendor-specific headers, such as fields in a HiGig™ header in a Broadcom chipset or any other chipset.

Figure 7:
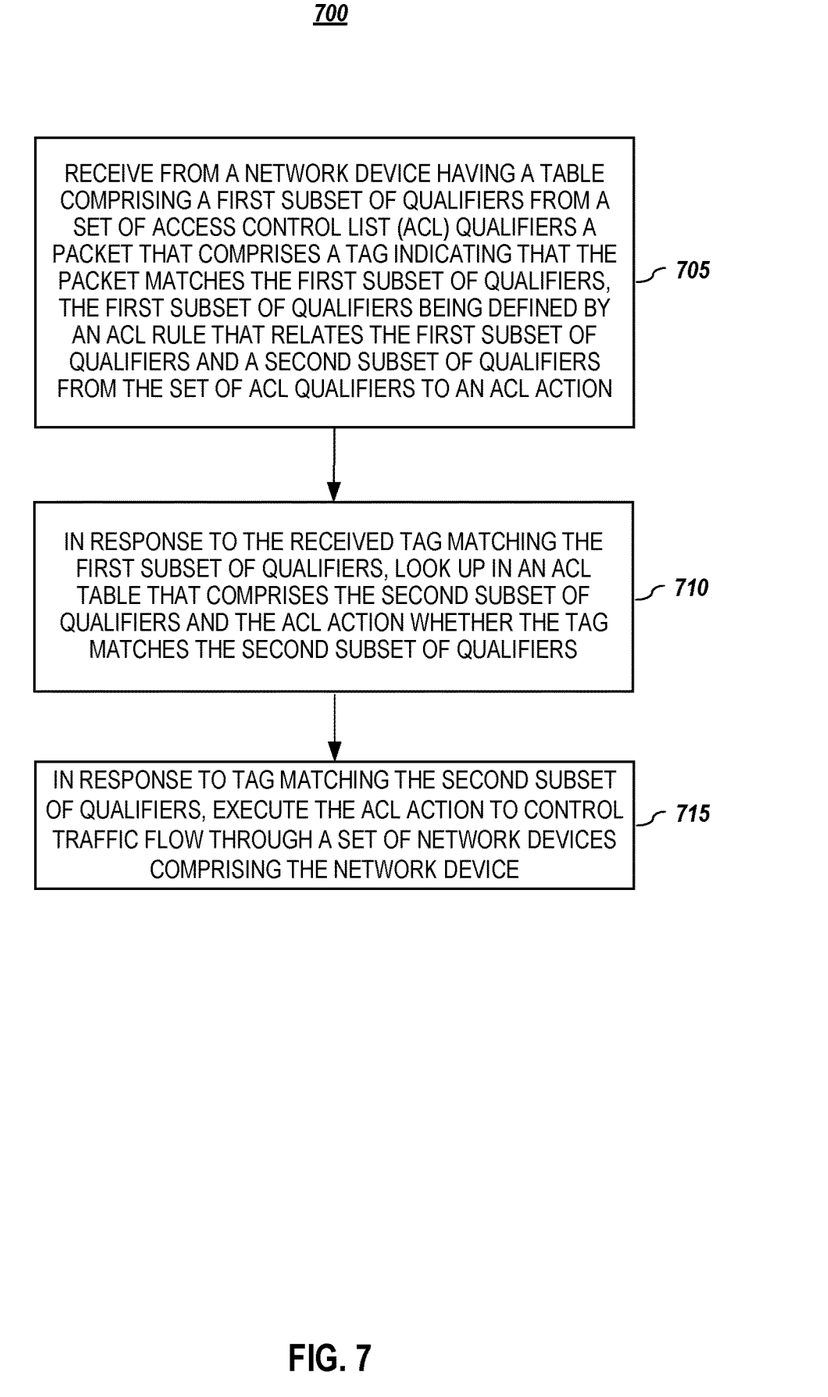
FIG. 7 is a flowchart illustrating a process for using an access control rule in an environment, such as that shown in FIG. 2 and implemented using a process, such as that illustrated in FIG. 6.

FIG. 7 is a flowchart illustrating a process for using an access control rule in an environment, such as that shown in FIG. 2 and implemented using a process, such as that illustrated in FIG. 6. In embodiments, process 700 in FIG. 7 begins by receiving (705) from a network device having a table comprising a first subset of qualifiers from a set of ACL qualifiers a packet that comprises a tag indicating that the packet matches the first subset of qualifiers, the first subset of qualifiers may be defined by an ACL rule that relates the first subset of qualifiers and a second subset of qualifiers from the set of ACL qualifiers to an ACL action. In response to the received tag matching the first subset of qualifiers, looking up (710) in an ACL table that comprises the second subset of qualifiers and the ACL action whether the tag matches the second subset of qualifiers. In response to tag matching the second subset of qualifiers, executing (715) the ACL action to control traffic flow through a set of network devices comprising the network device.

Figure 8:
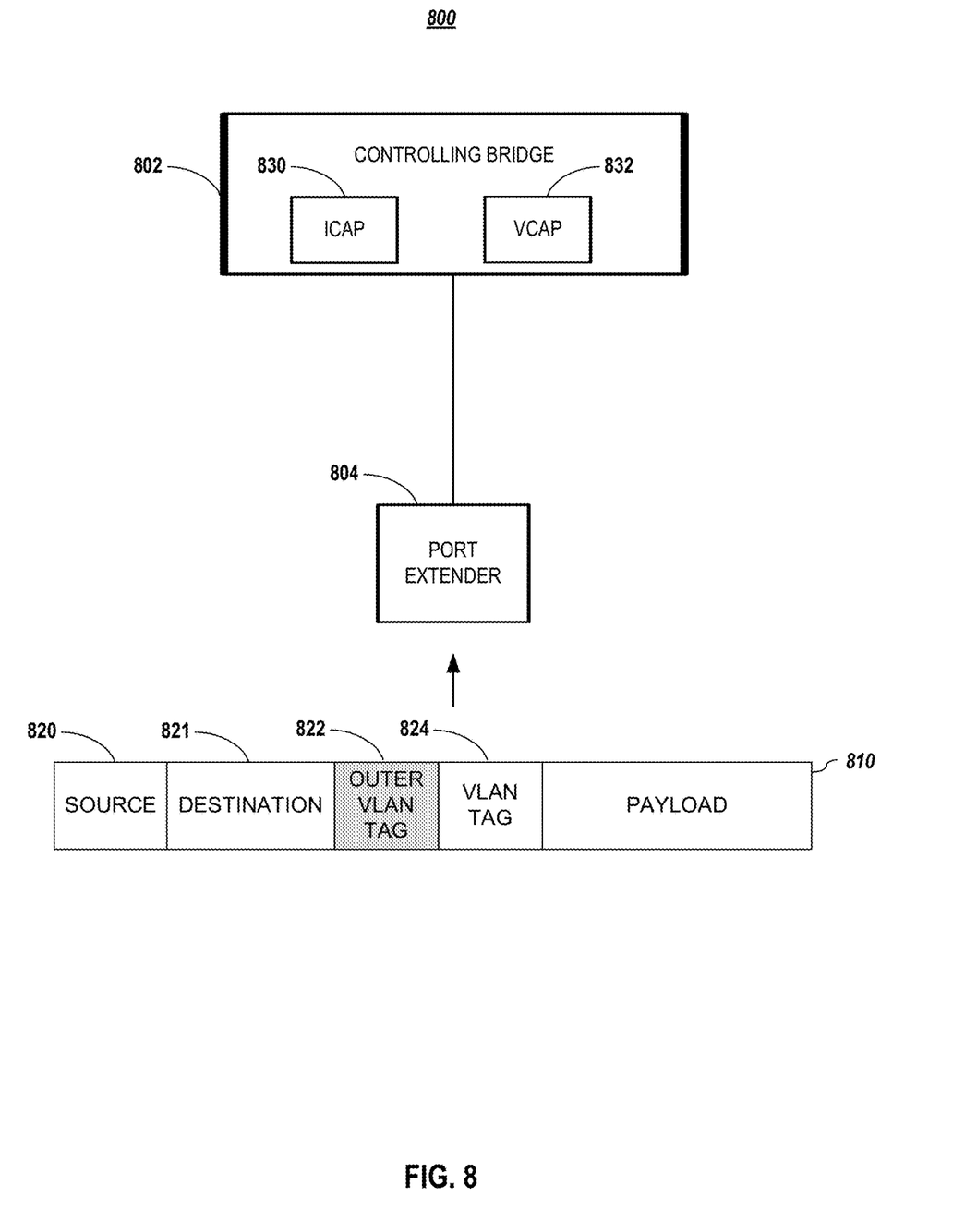
FIG. 8 illustrates a simplified system for implementing an access control rule across two devices for applications using IEEE 802.1q, according to embodiments of the present disclosure.

FIG. 8 illustrates a simplified system for implementing an access control rule across two devices for applications using IEEE 802.1q, i.e., by using a double VLAN tag, according to embodiments of the present disclosure. In embodiments, port extender topology of system 800 comprises controlling bridge 802 and port extender 804 that communicate packet 810. It is understood that any number of port extenders 804 may be used. Port extender 804 may comprise an ingress field processor (not shown in FIG. 8).

In embodiments, an additional or second VLAN tag or meta VLAN header, e.g., outer VLAN tag 822 may be added to a VLAG header 824 to carry metadata encapsulated in a VLAN field in packet 810. In embodiments, the outer VLAG header 824 may be used to generate a corresponding class ID in VLAN Content Aware Processor (VCAP) region 832 in controlling bridge 802 to a class ID in ICAP 830. In embodiments, the outer VLAN tag may have same or similar functions as an e-tag in embodiments utilizing an e-tag previously discussed.

In FIG. 8, exemplary port extender 804 may use an ingress field processor to execute an action that comprises adding outer VLAN header 822 to VLAN header 824 that has a VLAN ID. In embodiments, outer VLAN header 822 may identify a first set of qualifiers, such as destination IP address 821, associated with an ACL rule. As a result, in applications using Q in Q, port extender 804 may use one level of metadata to communicate to controlling bridge 802 source ID and use a second level of metadata, outer VLAN tag 822, to determine the class ID. It is envisioned that any number of metadata levels may be used and nested to carry class IDs.

In embodiments, VCAP 832 may use a VLAN field processor to execute an action that assigns to outer VLAN tag 822 a corresponding class ID that is the metadata that comprises the information about destination 821. Once VCAP 832 assigns the class ID, outer VLAN tag 822 is no longer needed and may, thus, be removed in VCAP 832, e.g., at controlling bridge 802, prior to ICAP 830 parsing. And the class ID may be used to pass information to ICAP 830. In embodiments, the ingress field processor may use the class ID that has been assigned by the VLAN field processor and a second set of qualifiers associated with the ACL rule, such as source IP address 820 to execute an action in an original ACL rule.

It is noted that, depending on implementation, a class ID may be added to the packet or it may be carried, e.g., on a separate metabus, before outer VLAN 822 is removed. Advantageously, since VCAP region 832 in pipelines is used before L2/L3 look up, using the class ID to relay information after the added Q in Q header has been removed, does not negatively impact regular lookup operations of the packet.

Figure 9:
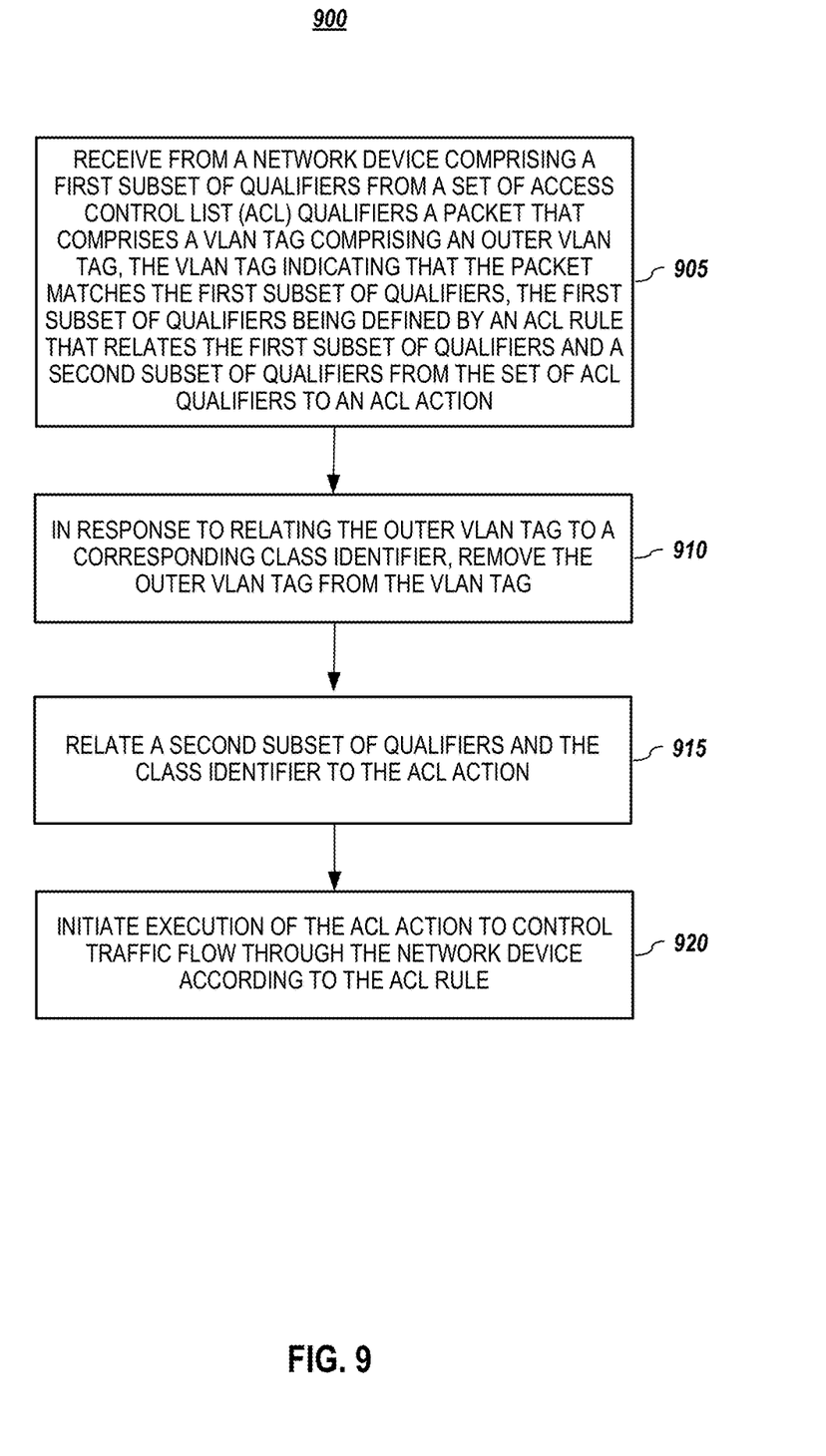
FIG. 9 is a flowchart illustrating a process for implementing an access control rule in an environment, such as that shown in FIG. 8.

FIG. 9 is a flowchart illustrating a process for implementing an access control rule in an environment, such as that shown in FIG. 8. Process 900 begins when a packet that comprises a VLAN tag comprising an outer VLAN tag is received (905), e.g., at a controlling bridge from port extender or any other network device that comprises a first subset of qualifiers from a set of ACL qualifiers. In embodiments, the VLAN tag may indicate that the packet matches the first subset of qualifiers that may be defined by an ACL rule that relates the first subset of qualifiers and a second subset of qualifiers from the set of ACL qualifiers to an ACL action. Then, in response to relating the outer VLAN tag to a corresponding class identifier, in embodiments, the following steps may be performed: the outer VLAN tag may be removed (910) from the VLAN tag; a second subset of qualifiers and the class identifier may be related (915) to the ACL action; and, finally, execution of the ACL action may be initiated (920) to control traffic flow through the port extender and the controlling bridge, according to the ACL rule.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
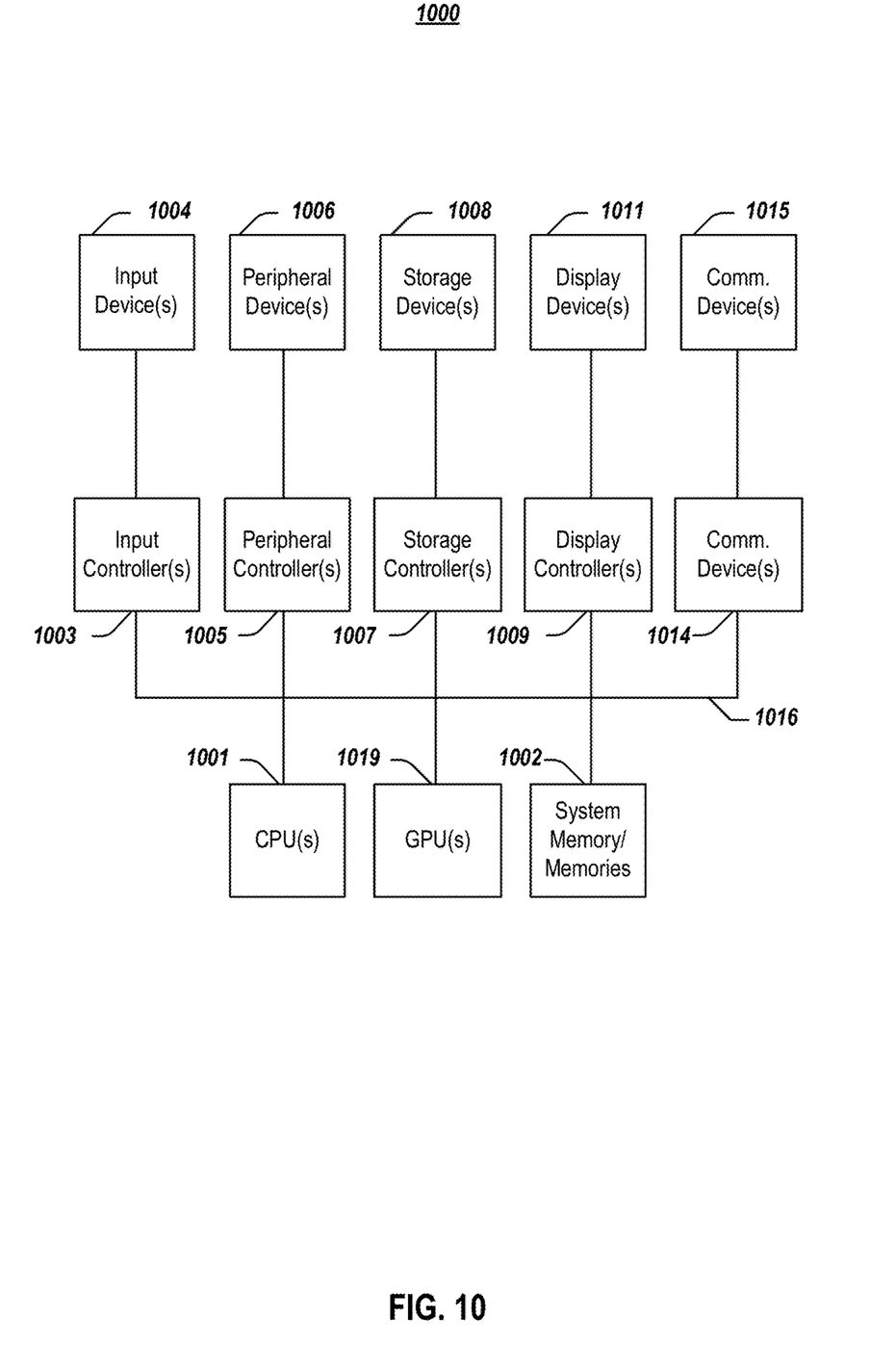
FIG. 10 depicts a simplified block diagram of an information handling system according to embodiments of the present invention.

FIG. 10 depicts a simplified block diagram of an information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of RAM, read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 11:
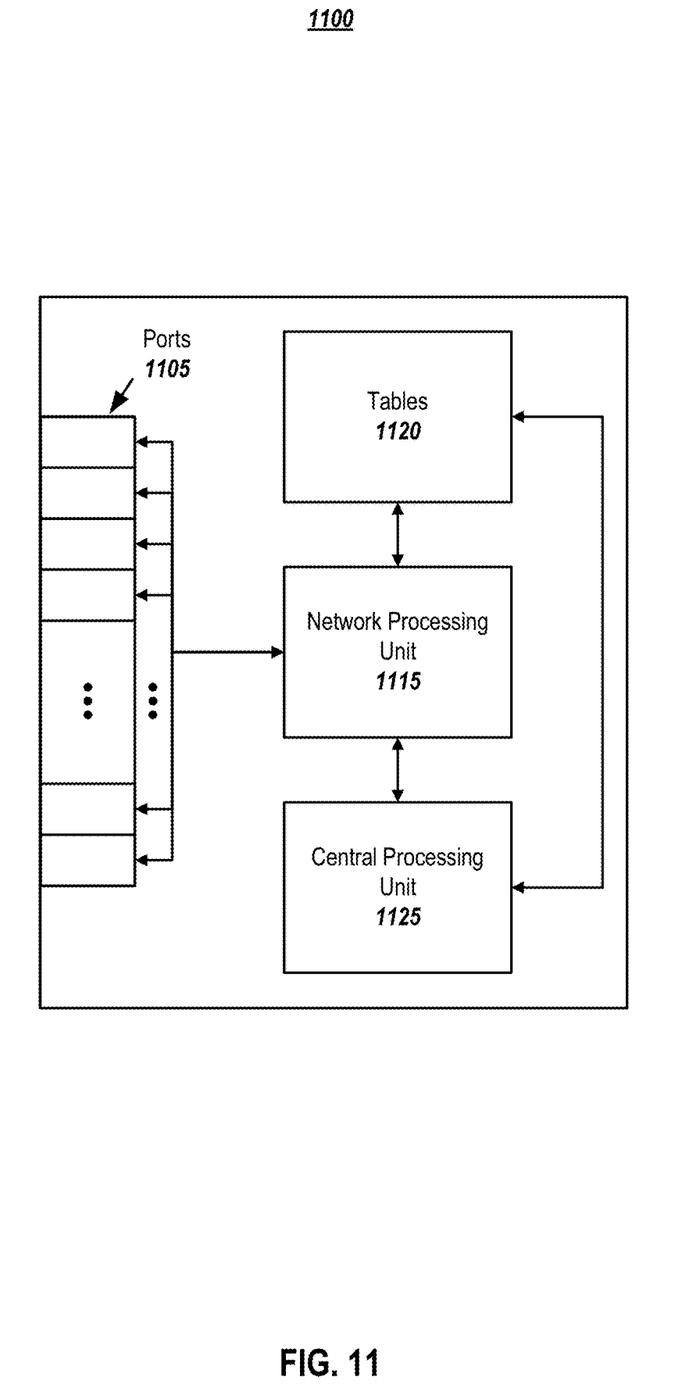
FIG. 11 depicts an alternative block diagram of an information handling system, according to embodiments of the present disclosure.

FIG. 11 depicts an alternative block diagram of an information handling system, according to embodiments of the present disclosure. It will be understood that the functionalities shown for system 1100 may operate to support various embodiments of the present disclosure—although it shall be understood that such system may be differently configured and include different components (including fewer or more components).

The information handling system 1100 may include a plurality of I/O ports 1105, a network processing unit (NPU) 1115, one or more tables 1120, and a central processing unit (CPU) 1125. The system includes a power supply (not shown) and may also include other components, which are not shown for sake of simplicity.

In one or more embodiments, the I/O ports 1105 may be connected via one or more cables to one or more other network devices or clients. The network processing unit 1115 may use information included in the network data received at the node 1100, as well as information stored in the tables 1120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for implementing an access control rule, the method comprising:
    responsive to an Access Control List (ACL) rule that exceeds a threshold amount of memory for an information handling system, the ACL rule comprising a set of ACL qualifiers and an ACL action to be performed on a packet that matches the set of ACL qualifiers:
    generating, for a first information handling system, a first rule comprising a first subset of qualifiers from the set of ACL qualifiers and a marking action to mark the packet with a tag if the packet comprises data or has associated metadata that matches the first subset of qualifiers; and
    generating, for a second information handling system, a second rule comprising a second subset of qualifiers that comprises a remaining set of ACL qualifiers from the set of ACL qualifiers that were not included in the first subset of qualifiers, the tag, and the ACL action, such that execution of the first rule and second rule applies the ACL action to the packet at the second information handling system.

2. The computer-implemented method of claim 1, wherein the second information handling system, in response to receiving the packet that has been marked with the tag and determining that the packet comprises data or has associated metadata that matches the second subset of qualifiers, performs the ACL action to control flow of the packet.

3. The computer-implemented method of claim 2, wherein each of the first rule and the second rule, when stored in a memory device, individually uses fewer bits in the memory device than the bits needed to store the ACL rule.

4. The computer-implemented method of claim 1, wherein the second information handling system uses the tag as an additional qualifier that relates the first subset of qualifiers to the ACL action.

5. The computer-implemented method of claim 1, wherein the first information handling system, responsive to receiving the packet that comprises data or has associated metadata that matches the first subset of qualifiers, marks the packet with the tag.

6. The computer-implemented method of claim 5, wherein the first information handling system marks the packet by including the tag in a header of the packet.

7. The computer-implemented method of claim 6, wherein the tag is an e-tag that comprises metadata in a reserved field.

8. A computer-implemented method for using an access control rule, the method comprising:
    receiving, from a first information handling system having a first rule comprising a first subset of qualifiers from a set of Access Control List (ACL) qualifiers, a packet that comprises a tag indicating that the packet comprises data or has associated metadata that matches the first subset of qualifiers, the first subset of qualifiers being defined by an ACL rule that relates the first subset of qualifiers and a second subset of qualifiers from the set of ACL qualifiers to an ACL action, in which, responsive to the ACL rule exceeding a threshold amount of memory, the ACL rule was split into the first rule for the first information handling system and a second rule for a second information handling system;
    in response to the packet having the tag, determining, using the second rule that comprises the second subset of qualifiers and the ACL action, whether the packet comprises data or has associated metadata that matches the second subset of qualifiers; and
    in response to the packet matching the second subset of qualifiers, executing the ACL action at the second information handling system.

9. The computer-implemented method of claim 8, further comprising including the tag as one of the qualifiers in the second subset of qualifiers that relates to the ACL action.

10. The computer-implemented method of claim 8, wherein the ACL action controls flow of the packet.

11. The computer-implemented method of claim 8, wherein neither the first rule nor the second rule, when stored in a memory device, uses more bits in the memory device than the bits that would be used to store the ACL rule.

12. The computer-implemented method of claim 8, wherein the first information handling system, responsive to receiving the packet that comprises data or has associated metadata that matches the first subset of qualifiers, marks the packet with the tag.

13. The computer-implemented method of claim 12, wherein the first information handling system is a port extender that marks the packet by including the tag in a header of the packet.

14. The computer-implemented method of claim 13, wherein the tag is an e-tag that comprises metadata in a reserved field.

15. A processor-implemented method comprising:
    receiving, from a first information handling system at a second information handling system, a packet that comprises a tag, the tag, which was added by the first information handling system according to a first rule, indicating that the packet comprises data or associated metadata that matches a first qualifier set comprising one or more qualifiers, the first qualifier set being defined by an Access Control List (ACL) rule that relates at least the first qualifier set and a second qualifier set comprising one or more qualifiers to an ACL action, in which, responsive to the ACL rule exceeding a threshold amount of memory, the ACL rule was split into the first rule for the first information handling system and a second rule comprising the second qualifier set and the ACL action for a second information handling system; and
    in response to determining that the packet comprises data or has associated metadata that matches the second qualifier set, initiating execution of the ACL action to process according to the ACL rule.

16. The processor-implemented method of claim 15, further comprising using the tag as one of the qualifiers of the second qualifier set.

17. The processor-implemented method of claim 15, wherein the tag is a VLAN tag in an outer VLAN header and wherein the step of in response to determining that the packet comprise data or has associated metadata that matches the second qualifier set, initiating execution of the ACL action to process the packet according to the ACL rule comprises:
   in response to relating the VLAN tag to a class identifier:
      removing the outer VLAN header; and
      assigning the class identifier to the packet; and
   in response to determining that the packet comprises data or has associated metadata that matches the second qualifier set and the class identifier, initiating execution of the ACL action according to the ACL rule.

18. The processor-implemented method of claim 15, wherein any one of the first qualifier set or the second qualifier set, when stored in a memory device, uses fewer bits in the memory device than the bits needed to store the ACL rule.

19. The processor-implemented method of claim 15, wherein the first information handling system, responsive to receiving the packet which comprises data or associated metadata that matches the first qualifier set, marks the packet with the tag.

20. The processor-implemented method of claim 19, wherein the first information handling system marks the packet with a tag by including a VLAN identifier in a header of the packet.

* * * * *